United States Patent

Parise et al.

[11] Patent Number: 5,656,160
[45] Date of Patent: Aug. 12, 1997

[54] COUNTER TOP WATER FILTER

[75] Inventors: Michael C. Parise; Rainer R. Schulz, both of Sparks, Nev.

[73] Assignee: Water Safety Corp. of America, Sparks, Nev.

[21] Appl. No.: 364,685

[22] Filed: Dec. 28, 1994

[51] Int. Cl.[6] ................................................ B01D 27/14
[52] U.S. Cl. .................. 210/232; 210/244; 210/282; 210/315; 210/416.3; 210/441; 210/446
[58] Field of Search .................................. 210/232, 244, 210/282, 314, 315, 316, 416.3, 437, 441, 446

[56] References Cited

U.S. PATENT DOCUMENTS

| | | | |
|---|---|---|---|
| 3,250,397 | 5/1966 | Moltchan | 210/282 |
| 3,342,340 | 9/1967 | Shindell | 210/282 |
| 4,218,317 | 8/1980 | Kirschmann | 210/416.3 |
| 4,826,594 | 5/1989 | Sedman | 210/282 |
| 5,032,268 | 7/1991 | Hahn | 210/282 |
| 5,108,599 | 4/1992 | Lowery | 210/282 |
| 5,120,437 | 6/1992 | Williams | 210/282 |
| 5,126,041 | 6/1992 | Weber et al. | 210/232 |
| 5,252,206 | 10/1993 | Gonzalez | 210/282 |
| 5,308,483 | 5/1994 | Sklar et al. | 210/232 |

*Primary Examiner*—Neil McCarthy
*Assistant Examiner*—Theodore M. Green
*Attorney, Agent, or Firm*—James M. Ritchey

[57] ABSTRACT

A counter top water filter unit intended for domestic use to be placed adjacent to a sink and having an inlet at its lower end which is coupled to the sink faucet through a swivelly mounted 90 degree elbow capable of 360 degree rotation so as to facilitate the coupling of the filter to the faucet from either side. The filter unit includes a cylindrical-shaped carbon particle filter cartridge which has a longitudinal passage extending from one end to the other, and a removable pre-filter screen coaxial with the cartridge and surrounding the cartridge, both elements being removably mounted within a cylindrical filter housing, the housing being closed at its upper end and open at its lower end.

6 Claims, 2 Drawing Sheets

COUNTER TOP WATER FILTER

BACKGROUND OF THE INVENTION

The present invention is concerned with a water filter unit which includes a main housing including a removable main filter cartridge, and it is intended primarily for domestic use to filter impurities out of tap water. The unit may be placed on a usual counter adjacent to the sink. The filter unit may conveniently be coupled to a diverter valve which, in turn, is connected to the sink water faucet. The diverter valve may be manually set for normal water flow from the faucet into the sink when it is in a first position, and for water flow through the filter unit of the invention when it is in a second position.

In the embodiment to be described, the filter unit of the invention is coupled to the diverter through a 90 degree elbow which is fitted into the inlet of the filter at its lower end for 360 degree rotational movement. This permits placement of the filter unit on either the left side or right side of the sink with a minimum length of connecting tubing.

The filter unit of the invention in the embodiment to be described is equipped with a pressure balanced 360 degree rotatable outlet housing, with an elongated spout being fitted into the outlet housing. The rotatable outlet housing, in turn, is mounted on an elongated fitting which extends into the interior of the filter. The subassembly is constructed to ensure smooth operation of the filter with or without water pressure in the system and to prevent the top of the filter from blowing off in the event off pressure buildup in the spout. The spout is equipped with a sani-tip and screen to provide a smooth, coherent stream of water without splatter.

A spring-loaded retaining ring is provided between the outlet fitting and the rotatable outlet housing to assure that the outlet housing rests firmly against the outer surface of the main housing of the filter unit to provide a smooth, constant friction bearing surface for the outlet housing as the spout is turned about the longitudinal axis of the filter, and to prevent the outlet housing from being pulled off the filter unit when the unit is carried by the top of the outlet subassembly.

Custom-designed sealing washers are provided with sealing ribs to create a leak-proof seal between the filtered and unfiltered water in the sealed filter unit and between the water within the filter unit and the outside world.

The filter unit of the invention, in the embodiment to be described, is also equipped with a pre-filter in the form of a removable and washable filter screen which extends around the main filter cartridge and which serves to prevent clogging of the main filter cartridge.

In summary, the counter top water filter unit is intended for domestic use to be placed adjacent to a sink and having an inlet at its lower end which is coupled to the sink faucet through a swivelly mounted 90 degree elbow capable of 360 degree rotation so as to facilitate the coupling of the filter to the faucet from either side. The filter unit includes a cylindrical-shaped carbon particle filter cartridge which has a longitudinal passage extending from one end to the other, and a removable pre-filter screen coaxial with the cartridge and surrounding the cartridge, both elements being removably mounted within a cylindrical filter housing, the housing being closed at its upper end and open at its lower end. The filter cartridge has an upper end cap and a lower end cap, with the upper end cap being spaced down from the closed top of the filter housing when the cartridge is in place. An outlet fitting is mounted between the upper end cap of the cartridge and the closed top of the filter housing, and extends through an opening in the closed top in coaxial relationship with the cartridge. The fitting has an internal passage communicating with the central passage of the cartridge. An outlet housing is rotatably mounted on the protruding end of the fitting and is secured to the fitting. A radially-extending elongated outlet spout is fitting into the outlet housing, and the spout is coupled to the passage which extends through the outlet housing. The spout and outlet housing are rotatable about the longitudinal axis of the filter. Water entering through the inlet in the lower end of the filter passes up into the filter housing and through the annular channel which surrounds the pre-filter screen. The water then passes through the pre-filter screen and through the filter cartridge. The resulting filtered water travels up the central passage of the cartridge and through the passage in the fitting to the outlet spout.

DETAILED DESCRIPTION OF THE ILLUSTRATED EMBODIMENTS

Figure 1:
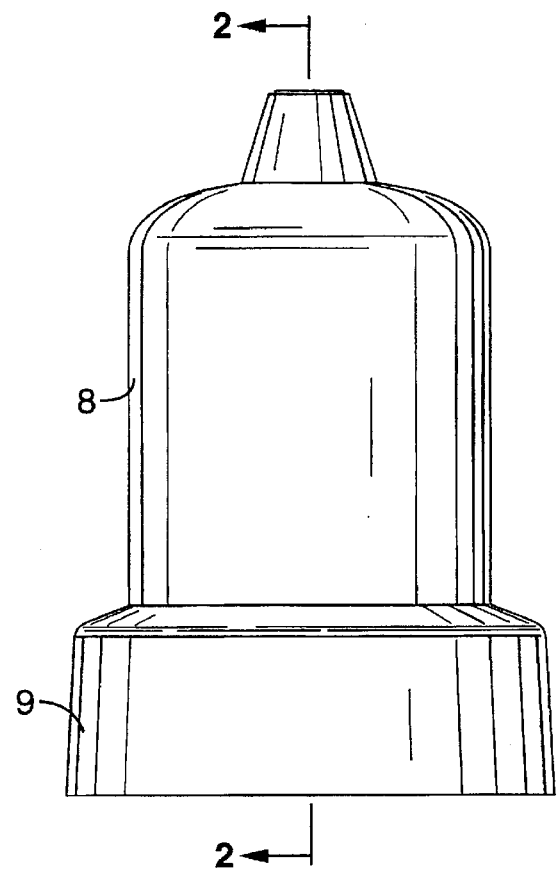
FIG. 1 is a side elevational view of a filter unit which may be constructed to incorporate the concepts of the present invention.
Figure 3:
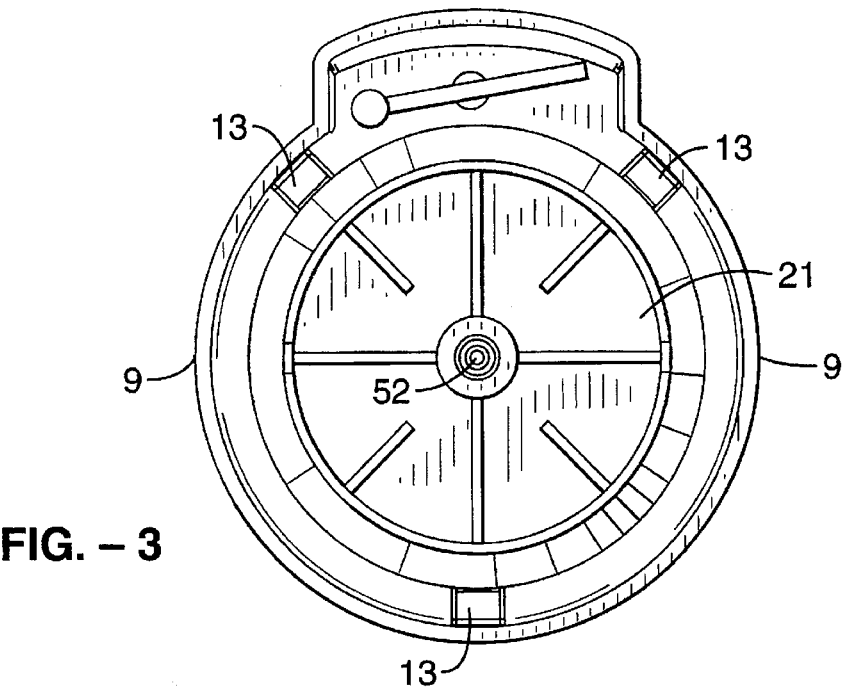
FIG. 3 is a bottom view taken essentially along the lines 3—3 of FIG. 2.
Figure 2:
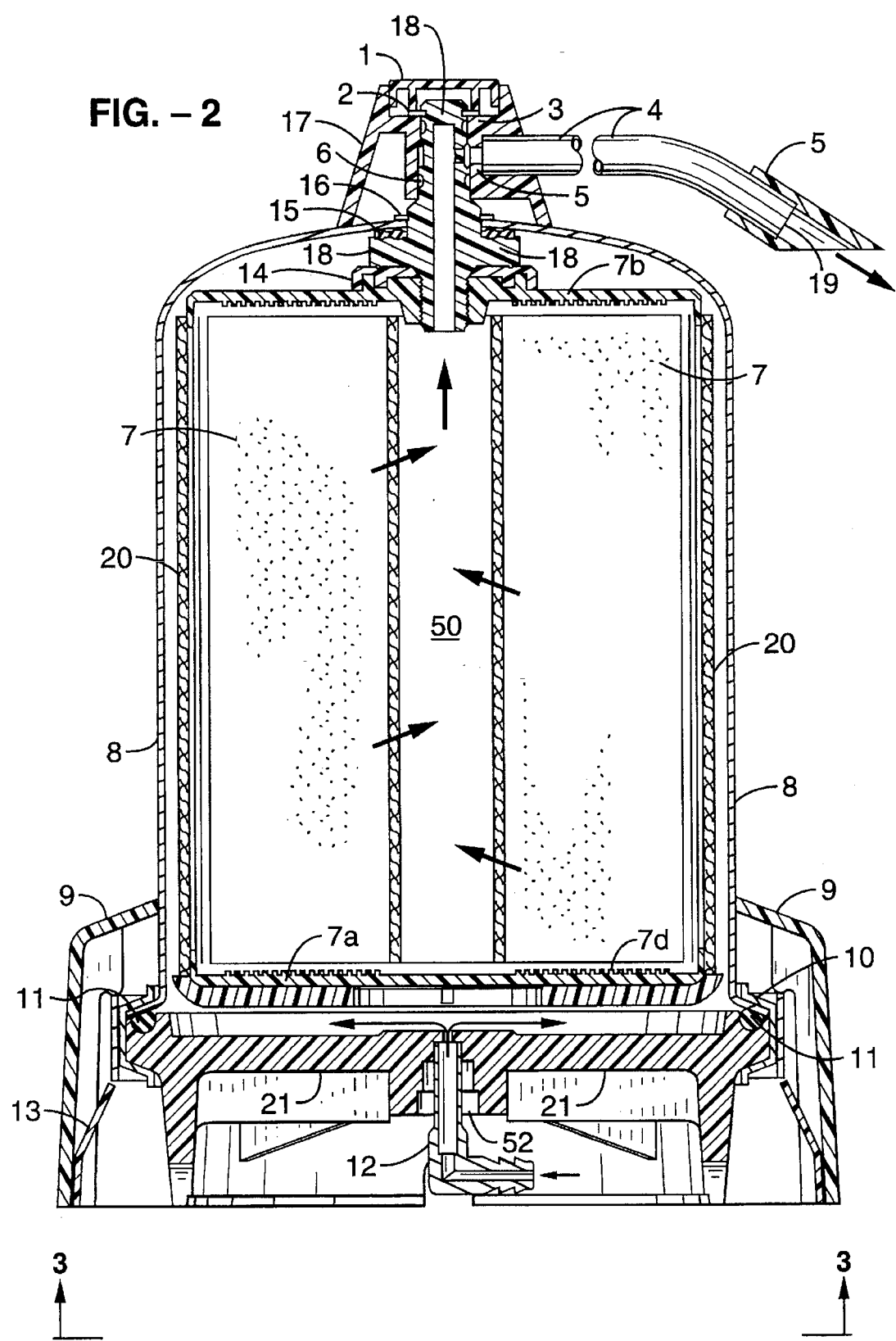
FIG. 2 is a side section of the unit of FIG. 1 taken essentially along lines 2—2 of FIG. 1.

The filter unit of the invention shown in FIGS. 1-3 includes a tubular filter housing 8 which is supported in an upright position on a base 21, with the housing and base being in coaxially relationship. A main cylindrical-shaped filter cartridge 7 is supported within the filter housing 8 in coaxial relationship. The filter cartridge 7 includes a quantity of carbon particles, or other appropriate filtering material. The cartridge 7 is constructed to have a central passage extending from one end of the cartridge to the other.

The filter cartridge 7 includes an upper end cap 7B and a lower end cap 7A. The lower end cap has reinforcing ribs 7D formed thereon to provide radial support for the lower end of cartridge 7. An elongated fitting 18 is mounted on the top of filter housing 8, and extends through an opening in the top to be interposed in the space between the upper end cap 7B and the undersurface of the top of filter housing 8. Fitting 18 has a passage extending longitudinally therethrough which communicates with the central passage 50 of the main filter cartridge 7. The fitting 18 is sealed to the underside of the top of filter housing 8 by a specially-designed washer 15, and is sealed to the top end cap 7B by a second specially-designed washer 14. Washers 14 serve effectively to seal the fitting to the top end cap 7B and to the filter housing 8. The fitting is secured to housing 8 by a retaining ring 16.

An outlet housing 17 is rotatably mounted on the protruding end of the fitting 18, and is effectively sealed with respect to the fitting by O-rings 3 and 6. The rotatable outlet housing is biased downwardly against the upper surface of the top of the filter housing 8 by a resilient retaining ring 2 which is held in place by a groove in fitting 18. The retaining ring 2 serves to bias the lower edge of the outlet housing 17 against the top surface of the filter housing 8 to provide a smooth bearing surface. The retaining ring provides constant pressure so as to establish a constant friction between the rotatable outlet housing 17 and the main filter housing 8 for smooth operation. A decorative cap 1 is fitted into the top of outlet housing 17.

A spout 4 is fitted into the side of the rotatable outlet fitting 18, as best shown in FIG. 2, and the spout extends radially outwardly from the fitting. The fitting has orifices which couples the central longitudinal passage of the fitting to the interior of the spout, so that filtered water passing upwardly in the central passage of the filter cartridge 7 and through the longitudinal passage in fitting 18 will pass through the spout.

The spout has a sani-tip 5 fitted over its distal end, with the distal end being covered by a usual screen 19 so that a smooth, coherent stream of filtered water is provided without splatter.

The main filter housing 8 is supported on a base 21 at its lower end, with the base being in coaxial relationship with the filter housing. The housing 8 is secured to the base by appropriate clamps 10 and sealed to the base by O-rings 11. An inlet is provided at the center of the base 22, and a 90 degree elbow 12 is fitted into the inlet 52. The elbow is coupled to a diverter valve which, in turn, is coupled to a faucet, with the diverter valve in one position permitting free flow of the water from the faucet into the sink, and in its other position causing the water to flow through the elbow 12 into the interior of the filter housing 8.

An open-ended tubular cover 9 is positioned around the lower end of the filter housing 8, and is clipped in place by clips such as the clip 13. The cover is easily removable by depressing the clips, so that the base may be removed for replacing the cartridge 7.

Unfiltered water from the faucet flows through the elbow 12 and through the inlet 52 in base 21 into the interior of the filter housing 8. The water is directed upwardly into the annular passage between the housing 8 and pre-filter screen 20, with the water passing through the pre-filter screen and then through the cartridge 7 in a radial direction into the central passage extending through the cartridge. The water is then forced upward through the longitudinal passage of fitting 18, and out through the spout 4, with filtered water being discharged through the outlet at the end of the spout.

The invention provides, therefore, an improved domestic filter unit for filtering tap water. The filter unit of the invention is efficient in its operation, compact and relatively simple in its construction, and may be easily opened to replace the filter unit.

While a particular embodiment of the invention has been shown and described, modifications may be made, and it is intended in the following claims to cover all such modifications which fall within the true spirit and scope of the invention.

I claim:

1. A counter top water filter unit, comprising:

a) a filter housing having a closed top and an open bottom;

b) a base removably mounted on said open housing bottom and closing said open housing bottom;

c) an inlet extending through said base into an interior of said housing;

d) a filter cartridge removably mounted in said housing and having an upper end and a lower end with a central passage extending between said upper and lower ends;

e) a pre-filter screen extending around said filter cartridge in coaxial relationship therewith between the periphery of said filter cartridge and an inner bore surface of said filter housing to form an annular passage extending around the periphery of said pre-filter screen;

f) upper end cap being spaced between said closed housing top and said filter cartridge upper end;

g) lower end cap being spaced between said base and said filter cartridge lower end;

h) an elongated outlet fitting mounted on said upper end cap in a space between said upper end cap and said closed top of said housing coaxial with said filter cartridge and extending longitudinally into said filter cartridge central passage and protruding longitudinally through said closed housing top;

i) an outlet housing in coaxial relationship with said elongated outlet fitting and rotatable about a longitudinal axis of said elongated outlet fitting;

j) a radial spout fitted into said rotatable outlet housing and communicating with said central passage of said filter cartridge through passages extending through said elongated outlet fitting;

k) first sealing means for sealing between said elongated outlet fitting and an underside of said closed top of said filter housing;

l) second sealing means for sealing between said elongated outlet fitting and an outer surface of the upper end cap of said cartridge; and m) third sealing means for sealing between said outlet housing and said elongated outlet fitting.

2. A counter top water filter unit according to claim 1, wherein said first sealing means comprises a first contoured washer.

3. A counter top water filter unit according to claim 1, wherein said second sealing means comprises a second contoured washer.

4. A counter top water filter unit according to claim 1, wherein said third sealing means comprises one or more O-rings.

5. A counter top water filter unit according to claim 1, further comprising reinforcing ribs formed on said lower end cap to provide radial support for said lower end of said cartridge.

6. A counter top water filter unit according to claim 1, in which said lower end cap has fins thereon for fitting beneath said lower edge of said pre-filter screen and within an inner surface of said pre-filter screen.

* * * * *